United States Patent [19]

Lorenz et al.

[11] Patent Number: 4,733,739

[45] Date of Patent: Mar. 29, 1988

[54] MOTOR VEHICLE SCUTTLE-DASH INSTUMENT PANEL COMPONENT OF PLASTICS MATERIAL HAVING AN INTEGRATED VENTILATING AND HEATING UNIT

[75] Inventors: Siegfried Lorenz, Fechen; Erich Altdorf, Cologne; Hans Vogt, Overath, all of Fed. Rep. of Germany

[73] Assignee: Ford Motor Company, Dearborn, Mich.

[21] Appl. No.: 803,746

[22] Filed: Dec. 2, 1985

[30] Foreign Application Priority Data

Dec. 22, 1984 [DE] Fed. Rep. of Germany ....... 3447185

[51] Int. Cl.$^4$ ........................ B62D 25/14; B60K 37/00
[52] U.S. Cl. ..................................... 180/90; 280/779; 296/72
[58] Field of Search ................ 180/90, 90.6; 280/779, 280/790; 296/70, 72, 73, 74; 248/503, 223.4, 224.1, 224.2, 225.1, 297.2

[56] References Cited

U.S. PATENT DOCUMENTS

| | | | |
|---|---|---|---|
| 229,582 | 7/1880 | Boda | 296/72 |
| 3,876,228 | 4/1975 | Hawkins et al. | 180/90 X |
| 3,904,222 | 9/1975 | Bursott et al. | 180/90 X |
| 4,223,754 | 9/1980 | Mizuno et al. | 180/90 |
| 4,274,646 | 6/1981 | Olligschlager et al. | 280/779 |
| 4,432,565 | 2/1984 | Suzuki et al. | 280/779 |
| 4,455,338 | 6/1984 | Henne | 180/90 X |
| 4,559,868 | 12/1985 | Nonaka et al. | 180/90 X |

FOREIGN PATENT DOCUMENTS

| | | | |
|---|---|---|---|
| 0081656 | 10/1982 | European Pat. Off. | 180/90 |
| 1962183 | 6/1970 | Fed. Rep. of Germany | 180/90 |
| 3119572 | 3/1982 | Fed. Rep. of Germany | 180/90 |
| 3143503 | 6/1982 | Fed. Rep. of Germany | 180/90 |
| 2110616 | 6/1983 | United Kingdom | 180/90 |

OTHER PUBLICATIONS

European publication, 0124093, Kochy, 11/84.

Primary Examiner—John J. Love
Assistant Examiner—Charles R. Watts
Attorney, Agent, or Firm—Peter D. McDermott; Roger L. May

[57] ABSTRACT

A motor vehicle scuttle-dash instrument panel component of plastics material having an integrated ventilating and heating unit comprising (i) a first part extending between the inner walls of the motor vehicle bodywork and having integrally formed hollows and walls adapted to receive components of the ventilating and heating unit, (ii) a second part likewise extending between inner walls with correspondingly matching shaped hollows and walls. When the two parts are adjacent they form together a unit having spaces and channels of a specific shape. The first and second parts can be inserted in the bodywork as a pre-assembled structural member supplemented by the corresponding components of the ventilating and heating unit and additional covering elements and being connected to the bodywork by way of lateral flanges. Both the first part (2) and the second part (3) are constructed as fibre-reinforced rigid polyurethane foam-material moulded articles, being securely joined to one another by adhesive in their peripheral regions along a substantially horizontal junction plane (6) to form a box-like transverse support member which cooperates in force-transmitting manner with the bodywork structure by way of the aforesaid lateral flanges, e.g., bead or wedge-shaped edges (8 and 9) which are formed on the lateral edges of the support member lying in the approximately horizontal junction plane (6). The lateral flanges are received and secured by adhesive approximately horizontally in guide channels (10) which have an appropriate cross-section and are provided on the inner wall (11) of the bodywork.

23 Claims, 13 Drawing Figures

MOTOR VEHICLE SCUTTLE-DASH INSTUMENT PANEL COMPONENT OF PLASTICS MATERIAL HAVING AN INTEGRATED VENTILATING AND HEATING UNIT

The invention relates to a motor vehicle scuttle-dash instrument panel component of plastics material having an integrated ventilating and heating unit.

The German Offenlegungsschrift (Laid-Open Specification) No. 31 19 572 discloses a motor vehicle scuttle-dash instrument panel component of plastics material having a partially integrated ventilating and heating unit, which comprises a first part, which extends between the inner walls of the bodywork and has integrally formed hollows and walls to receive components of the heating and air-conditioning unit, and a second part, which likewise extends between the inner walls and has matching shaped hollows and walls, the adjacent two parts forming spaces and channels of specific shape. The scuttle-dash instrument panel component, which comprises such first and second part, together with the corresponding components of the air-conditioning and heating unit and additional covering parts are finished as a pre-assembled structural member, placed into the bodywork, and joined to the inner walls of the bodywork by way of lateral flanges. As used herein, the term "bodywork" refers to the structural members of the motor vehicle, that is, typically the frame and/or so-called unibody components of the motor vehicle.

In this connection the known scuttle-dash instrument panel component has the disadvantage that only the first part consists of a plastics material with a high degree of mechanical strength, whereas the second part consists of a plastics material having a lower degree of mechanical strength, in order to have the required resilience of an instrument panel covering towards the passenger compartment. The first and second parts which have been joined can therefore hardly complement one another in terms of strength, and the fastening of the structural member to the body work cannot therefore contribute to a transverse reinforcement of the bodywork but only serves to hold the structural member in position.

The German Offenlegungsschrift No. 32 43 503 discloses a further scuttle-dash instrument panel component of plastics material having an integrated ventilating and heating unit and being a completed pre-assembled structural member comprising four individual parts which are joined to one another along different junction planes. In this connection the completed, pre-assembled structural member is supported in the bodywork by way of interposed sealing elements on an upper and a central transverse support of the bodywork, which ensure a transverse reinforcement for the bodywork, while the structural member is only held on the latter.

A component for the cockpit area of a motor vehicle is known from the European Application No. 00 81 656, which comprises a plurality of pre-assembled components joined together. The component is inserted into the bodywork as a completed and checked component and is secured to the dashboard of the bodywork. This component too only supports its own parts and is not used for the reinforced of the bodywork structure.

The object of the invention is to provide an improved motor vehicle scuttle-dash instrument panel component of plastics material having an integrated ventilating and heating unit. More particularly, the object is to provide such instrument panel, wherein two parts joined together by adhesive means form a box-like transverse support which decisively contributes to a longitudinal, transverse and torsional reinforcement of the bodywork structure by a suitable positive and non-positive fastening on the inner walls of the bodywork and, in addition, absorbs all the necessary ventilating and heating or air-conditioning units in a fully integrated form.

In addition, the large-volume box-like transverse support formed by the two parts joined together by adhesive means can be designed in such a way that, in the event of a frontal collision, it forms a barrier deformable in a controlled manner for the vehicle engine which is forced back.

According to the present invention, a motor vehicle instrument panel of plastics materials, having an integrated ventilating and heating unit forms a structural member, that is, a structural component of the vehicle bodywork. It comprises:

a first part extending between the inner walls of the bodywork of the motor vehicle, having integrally formed hollows and walls adapted to receive components of ventilating and heating units, a second part likewise extending between such inner walls and having hollows and walls corresponding in shape and location to those of the first part, components of the aforesaid ventilating and heating unit received by the hollows and walls of the first part and second part, and instrument panel covering components, both the first part and the second part having peripheral regions with surfaces of each being securely, adhesively joined to surfaces of the other in a substantially horizontal junction plane, the first part and the second part together forming a substantially box-shaped transverse support fixedly attached to the inner walls of the bodywork by means of lateral flanges in such approximately horizontal junction plane which are received in approximately horizontal guide channels of substantially corresponding cross-section in the inner walls of the bodywork, the guide channels being at least partially filled with adhesive to form, upon being cured, a positive connection between the flanges and the inner walls such that the transverse support cooperates with the bodywork in a force transmitting manner.

The aforesaid first part and the second part are preferably constructed as fibre-reinforced rigid polyurethane foam-material moulded articles and are adjacent to one another in their forward regions along a substantially horizontal junction plane and in their rear regions along a junction plane rising at an angle. They are securely joined to one another to form a box-like transverse support which is joined to the bodywork structure in a force-transmitting manner by way of lateral flanges, e.g., bead or wedge-shaped edges which are formed on the lateral edges lying in the horizontal junction plane and which are received approximately horizontally in guide channels with a corresponding cross-section provided on the inner walls of the bodywork. As a consequent advantage of the invention, the weight of an otherwise necessary closure plate from the end wall to the scuttle-dash can be saved. As a further consequent advantage of the structural member according to the invention reinforcing the bodywork structure, in the event of a frontal collision the force of the vehicle engine being pushed back can be absorbed by controlled deformation of the structural member.

The motor vehicle scuttle-dash instrument panel component of the invention can be easily produced as a common assembly with the operating means of the steering column and pedal arrangement. More particularly, a pedal block known per se and pre-assembled from a steering column arrangement and a pedal arrangement can be secured by way of a first mounting strap to the aforesaid two parts connected together. After the two interconnected parts have been inserted into the bodywork structure, the pedal block is secured at the top to the scuttle-dash by way of a second mounting strap and at the bottom on the dashboard alternatively by way of a mounting flange of the pedal block.

Thus, by virtue of the fact that a transverse support is integrated in the supporting part, a steering column arrangement known per se and a separate pedal block can be pre-assembled in a simple and secure manner.

On the upper side of the first part can be integrally formed the blower casing lower part, the return-air air-conditioning casing and the web provided for securing to the top of the scuttle-dash. The upper half of the heating casing can be integrally formed on the lower side, while a glove compartment and pockets can be integrally formed on the upper side. As a consequent advantage, a plurality of individual casings and their manufacture and assembly, which were previously necessary, are dispensed with.

By virtue of the fact that, in addition to the first and second supporting part, a further component, which forms the blower cover and, in addition, the return-air air-conditioning cover, and a part which forms a dashboard covering are added, a fully completed scuttle-dash instrument panel is produced.

For components such as blower covers or air distribution flaps, preferably non-reinforced rigid polyurethane foam material is used.

For the instrument panel covering, which must also have an attractive exterior and must also meet any applicable safety requirements with respect to a head impact on the part of a passenger, a component can preferably be produced which has a dyed polyurethane integral foam-material outer skin cast in the expansion mould in conjunction with a support member of fibre-reinforced rigid polyurethane foam material, the outer skin and the support being joined together by filling with a support and padding foam based on polyurethane, as a result of which the desired soft gripping capacity of the instrument panel covering is achieved.

The scuttle-dash instrument panel component which is formed by components joined together and which is completed with all the components and unit to be fitted can be tested for its operation outside the motor vehicle, so that only structural members which have been found to be in order are assembled in the motor vehicle bodywork.

The invention is described in greater detail with reference to one embodiment illustrated in the drawings, in which FIG. 1 is a vertical longitudinal section through a motor vehicle scuttle-dash instrument panel component according to the invention;

FIG. 2 is a diagrammatic view of the connection of the completed pre-assembled structural member with adjacent bodywork walls, connection areas shown emphasized in circles being on an enlarged scale;

FIGS. 2a and 2b showing alternative embodiments of the main connections to the inner walls of the bodywork;

FIGS. 5a and 5b an alternative embodiments of the steering column and pedal arrangement in the non-assembled state;

FIG. 6a is a partial section through one embodiment of the steereing column and pedal arrangement according to FIG. 5a;

Figure 1:
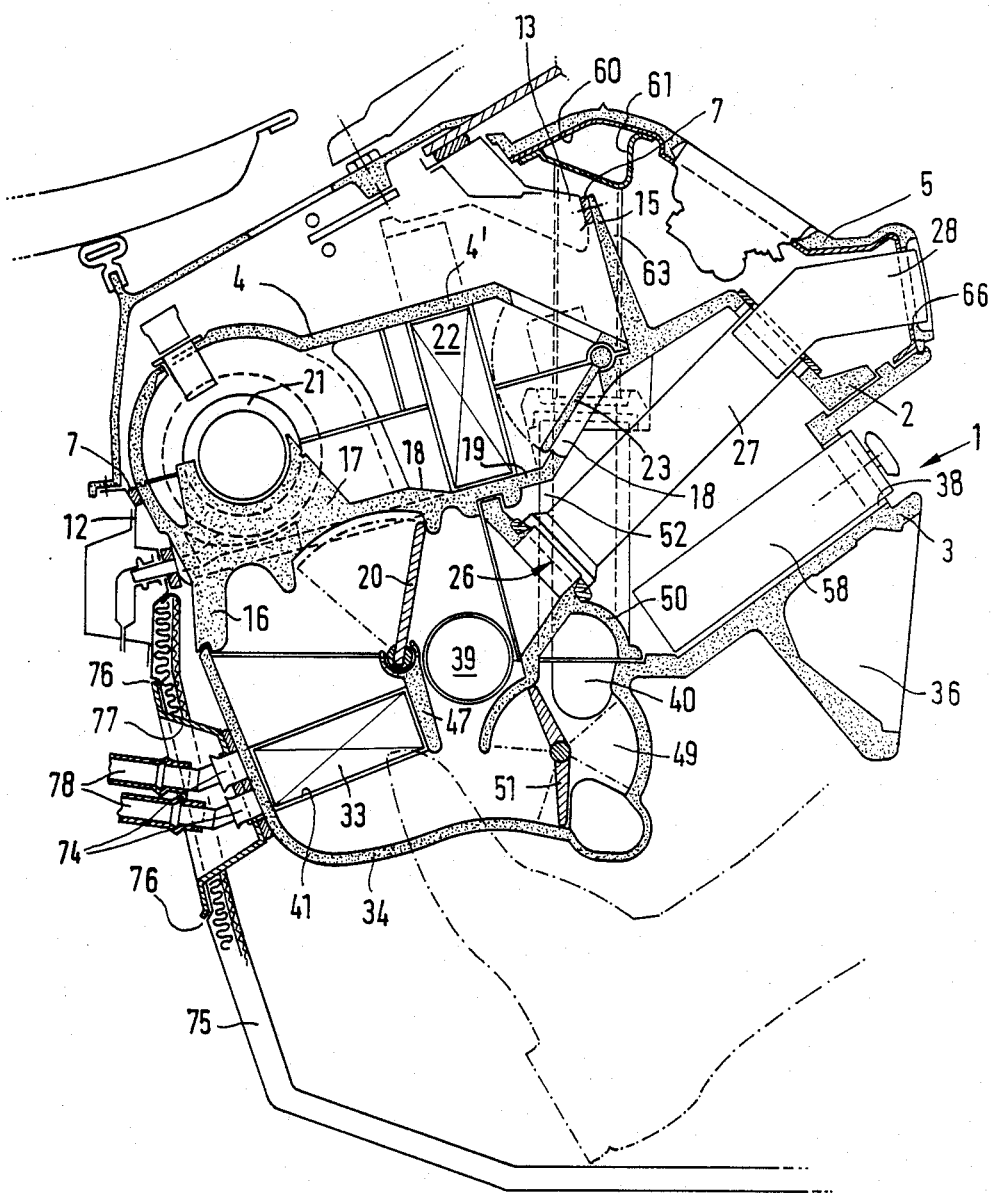
Figure 2:
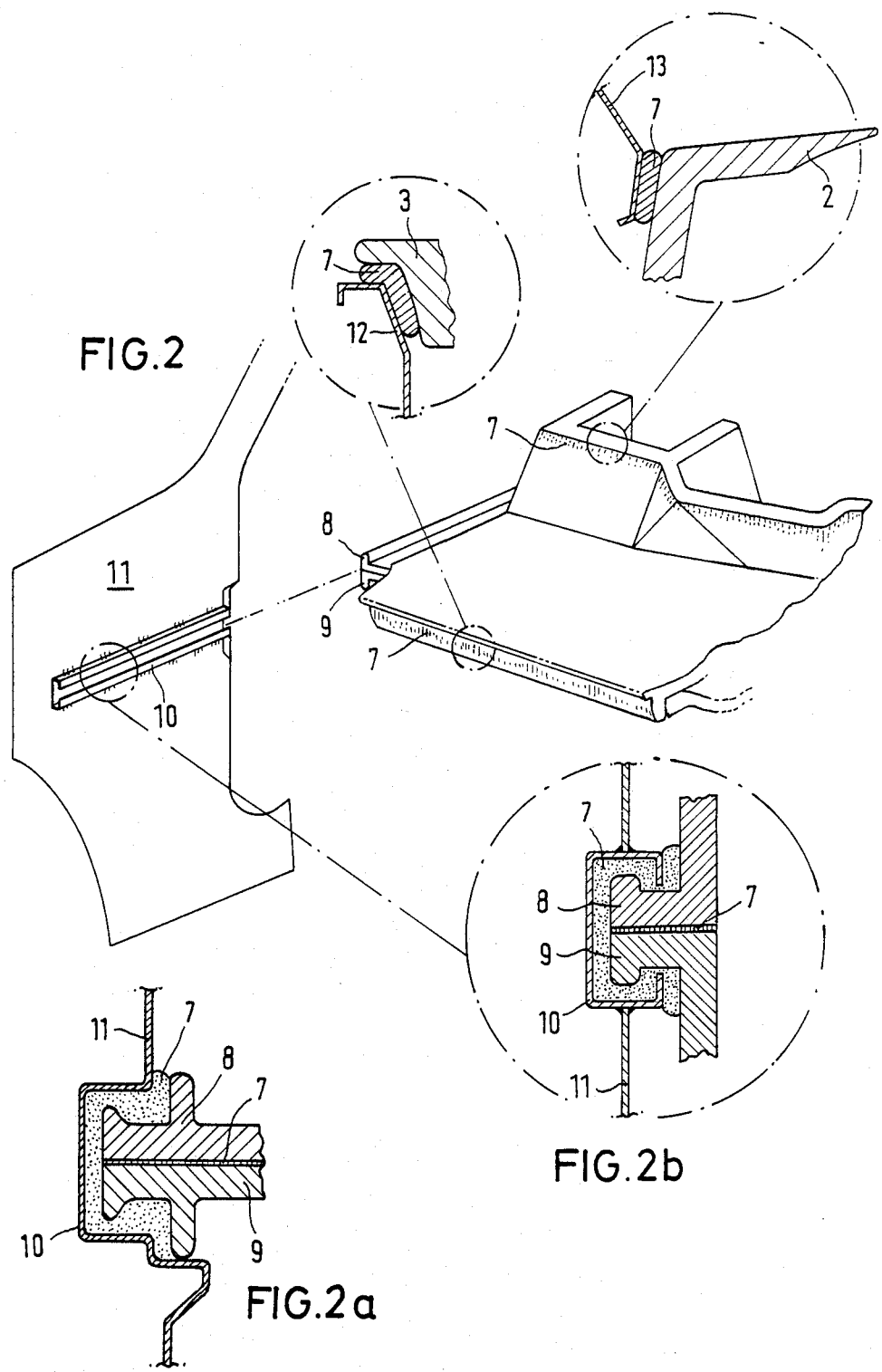

In FIG. 1 the scuttle-dash instrument panel component of plastics material with an integrated ventilating and heating unit and air-conditioning unit is designated 1.

The scuttle-dash instrument panel component 1 essentially comprises four parts, a first central support part 2 of a rigid polyurethane foam material fibre-reinforced from a mat of continuous fibres, a second lower support part 3, likewise of fibre-reinforced rigid polyurethane foam material, a third part, a blower cover 4 of non-reinforced rigid polyurethane foam material, and a fourth part, an instrument panel covering 5 as a composite component of a support of fibre-reinforced rigid polyurethane foam material in conjunction with a support and filling foam of polyurethane and an outer skin of a dyed skin-forming polyurethane foam material.

As is evident from FIGS. 1, 2, 3 and 4 in particular, the supporting first and second parts, i.e., the central support part 2 and the lower support part 3 bear against one another along an approximately horizontal junction plane 6 which lies in their forward regions (and is indicated by dash-dot lines). The central support part 2 and the lower support part 3 are provided on their lateral edges lying in the approximately plane 6 with a lateral flange, such as bead or wedge-shaped edges 8 and 9, respectively, which are received, horizontally inserted, in corresponding guide channels 10 which have a C-shaped or dovetailed cross-section and which are secured to the inner wall 11 of the bodywork.

In this connection, the two support parts, the central support part 2 and the lower support part 3 are securely joined together along their approximately horizontal junction plane 6 by way of a thin-film adhesive 7, so as to produce a rigid box-like transverse support. The double-sided bead or wedge-shaped edges 8 and 9 now formed on the edges of the joined parts 2 and 3 are securely joined by a polyurethane adhesive 7 to the guide channels 10 on the inner walls 11 of the bodywork. The box-like transverse support member also is secured to the end wall 12 and the scuttle-dash 13 by way of adhesion zones, in such a way that the scuttle-dash instrument panel component of plastics material according to the invention can effect the required longitudinal, transverse and torsional reinforcement in the region of the front bodywork. As a result of this, for example, the weight for the closure plate from the end wall to the scuttle-dash can be avoided in the sheet metal bodywork structure. In this connection, the large-volume box-like transverse support thus formed can be designed in such a way that it forms a barrier—which can be deformed in a controlled manner—to the vehicle engine being forced backwards in the event of a frontal collision.

Figure 3:
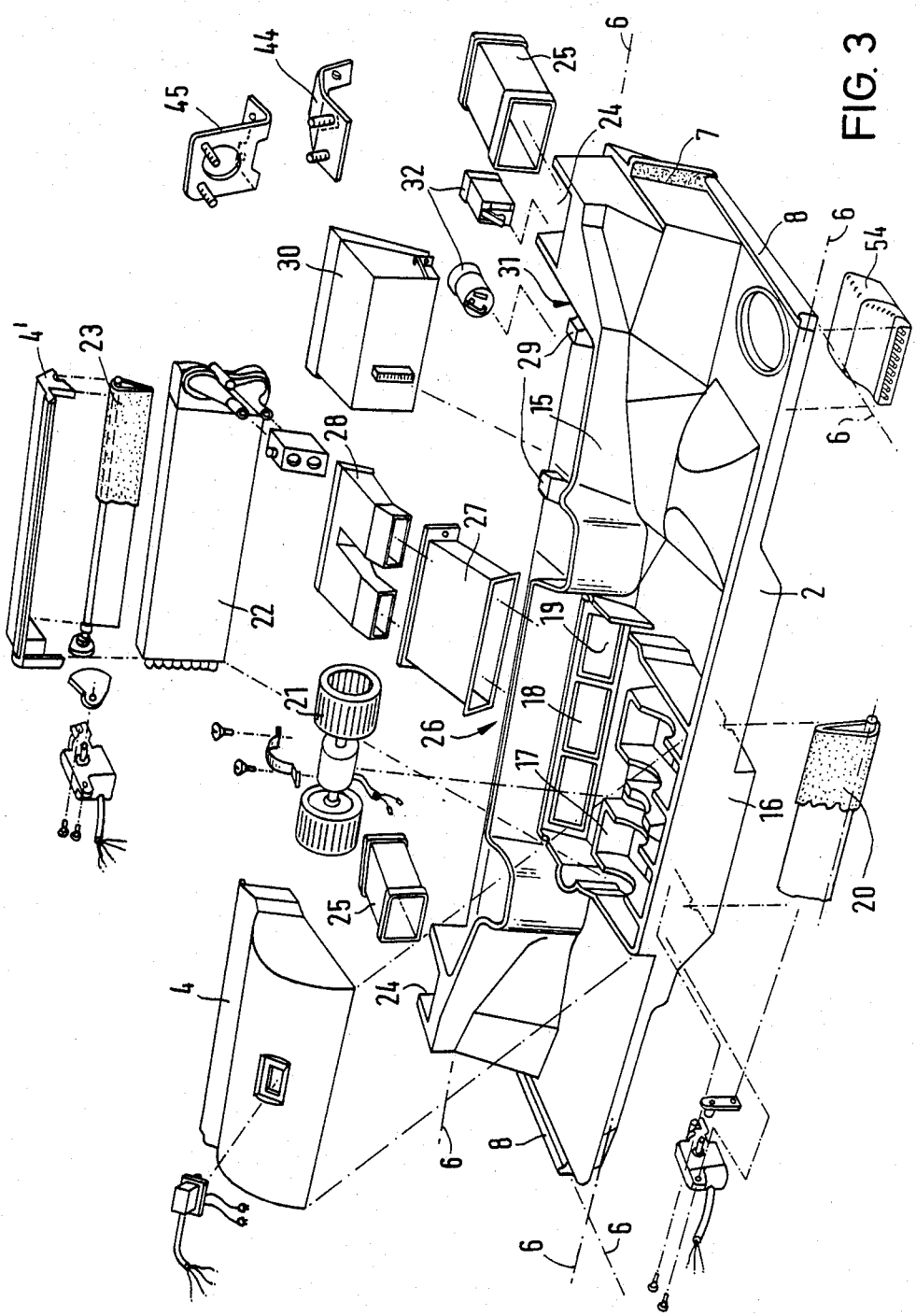
FIG. 3 is an exploded view of the first, central support part with all the components of the ventilating, heating and air-conditioning unit insertable therein.

As is evident from FIG. 3 in particular, the central support part 2 comprises a plurality of moulded spaces and walls which form at least some parts of previously required structural members of the ventilating, heating and air-conditioning units.

In the central support part 2 a heating casing upper part is formed at 16, a blower casing lower part is formed at 17, an air-conditioning casing lower part is formed at 18 and a return-air casing is formed at 19. A mixing flap 20 can be inserted in corresponding bearing holders in the region of the heating casing upper part 16, a complete heating blower 21 can be secured in the region of the blower casing lower part 17, a cold exchanger 22 can be disposed in the region of the air-conditioning casing lower part 18, and a return-air flap 23 with the corresponding control devices can be disposed in the region of the return-air casing lower part 19. In this connection the blower area is closed by a blower cover 4 and the area of the air-conditioning unit is closed by a cover 4'.

In addition, connections 24 for lateral nozzle ducts 25 and connections 26 for central nozzle ducts 27 and 28 are provided on the central support part 2. Furthermore the central support part 2 comprises a receiving member 29 for a multi-purpose instrument 30 and receiving members 31 for electric switches 32. In this connection the electrical cabling (not shown) of the positioning components can be arranged in appropriate form on the central support part 2, this cabling preferably being provided in the form of face plate cables or printed flexible circuits with a central connection plug 54.

Figure 4:
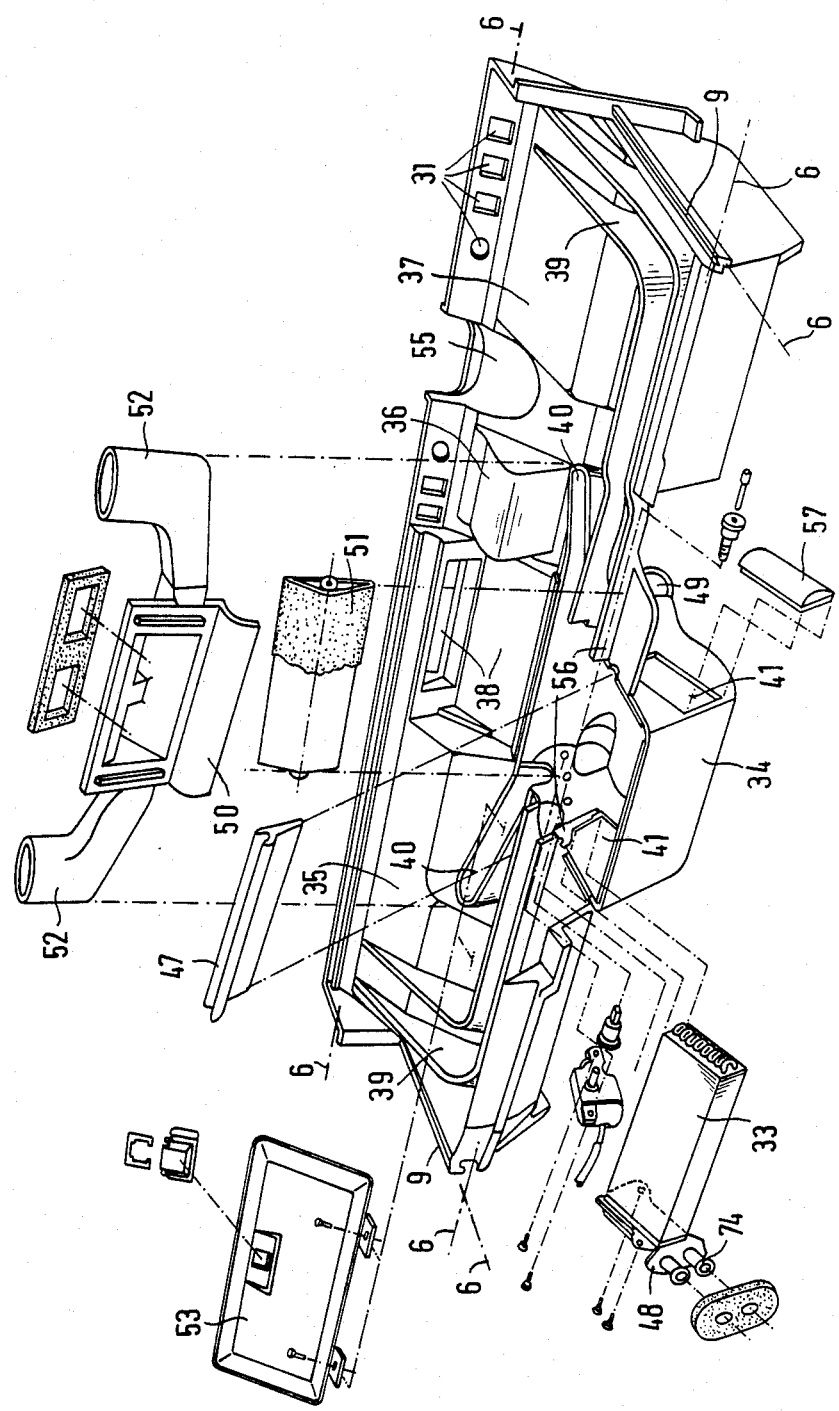
FIG. 4 is an exploded view of the second, lower support part with all the components of the ventilating, heating and air-conditioning unit insertable therein.
Figure 5:
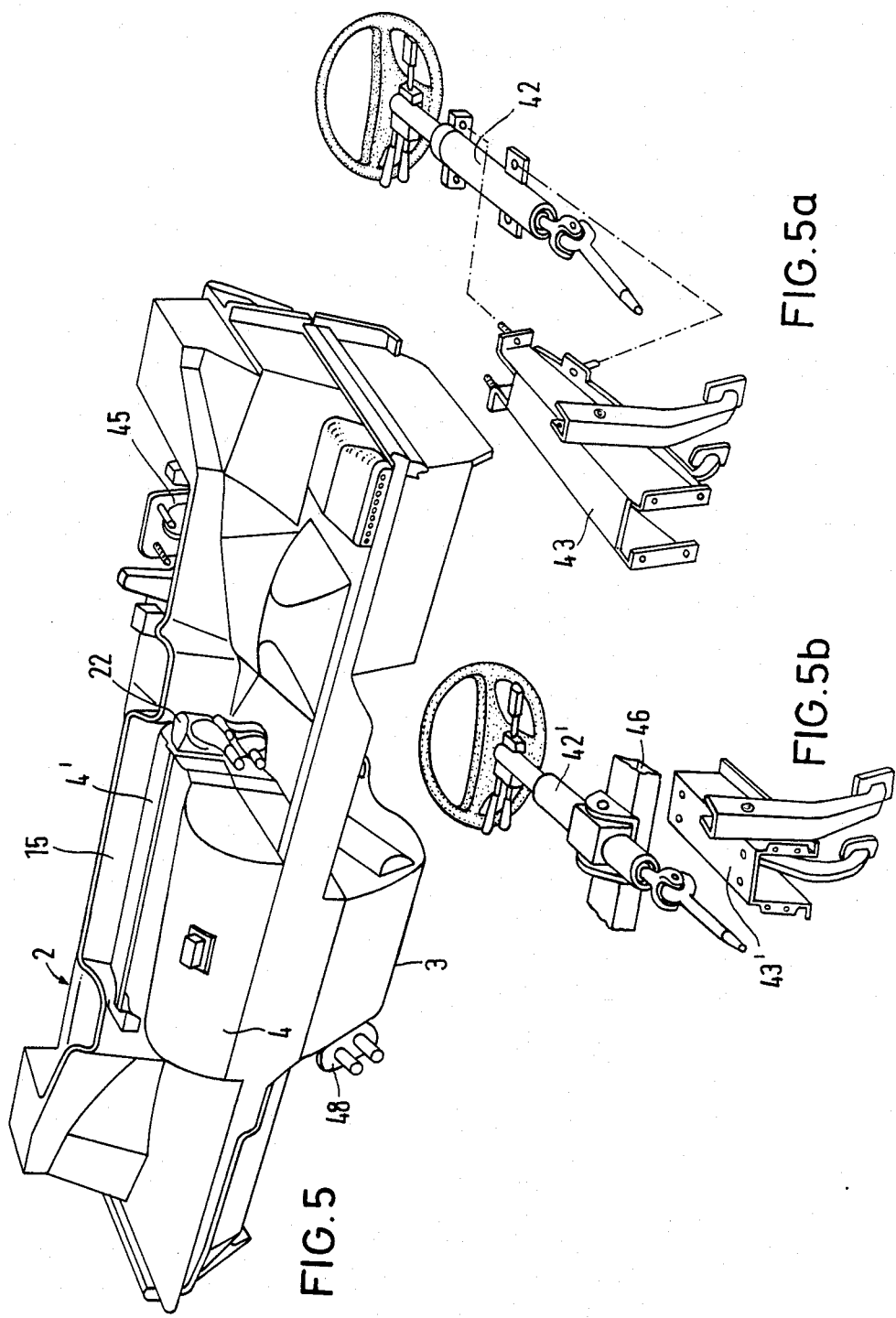
FIG. 5 is an oblique view of the assembled components corresponding to FIGS. 3 and 4.

As can best be seen from FIG. 4, the lower support part 3 comprises a plurality of spaces and walls which form at least in part previously required component groups. In the lower support part 3 a heating casing lower part for a heat exchanger 33 is formed at 34, a glove compartment is formed at 35, a receiving member for an ashtray is formed at 36, a pocket is formed at 37 and a receiving member for a car radio is formed at 38.

In addition, air ducts 39 to the lateral nozzles and air ducts 40 to the defroster nozzles are formed on the lower support part 3. Furthermore, a receiving member 55 for positioning the steering column arrangement 42 of the motor vehicle is provided in the lower support part 3.

The steering column arrangement 42 comprises a pre-assembled structural unit in which are disposed the steering column cover and its fastening, the steering shaft, the switches arranged on the steering column cover and the steering wheel.

Figure 6:
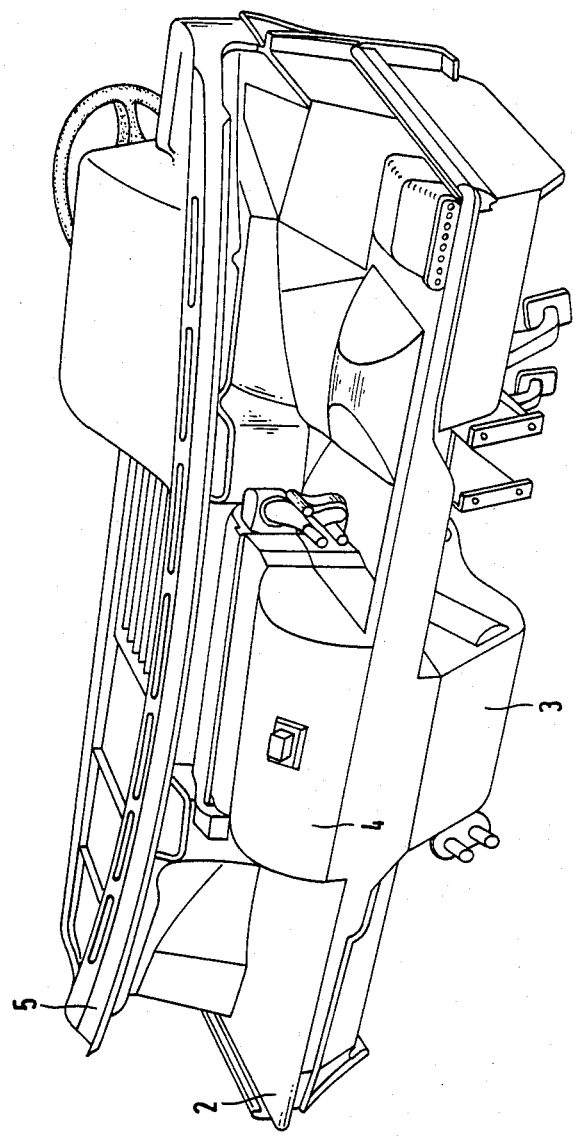
FIG. 6 is an oblique view of the fully completed scuttle-dash instrument panel component.
Figure 6A:
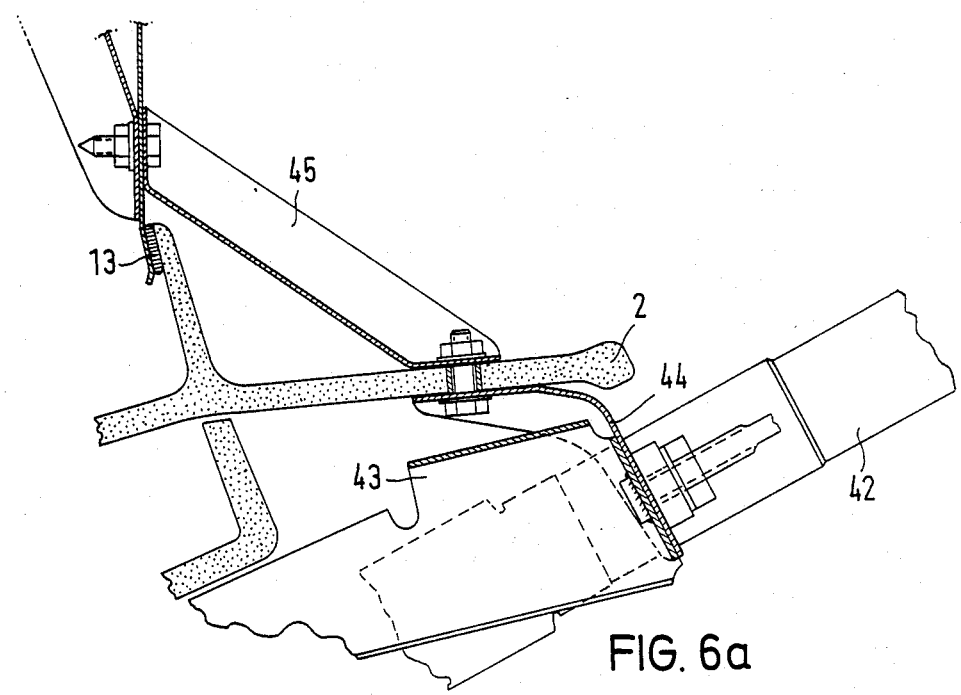

In accordance with one embodiment (FIG. 6a) the steering column arrangement 42 is secured to a pedal block 43 which essentially comprises a U-shaped sheet metal bracket, between the arms of which the appropriate pedals for operating the motor vehicle are arranged. The assembled steering column arrangement 42 and the pedal arrangement 43 are secured by way of a first mounting strap 44 in conjunction with a second mounting strap 45 to the parts 2 and 3 joined together, in such a way that the supporting structural member supports the steering column arrangement 42 and the pedal arrangement 43 until the structural member is inserted in the bodywork structure and the pedal block 43 is secured to the dashboard and the second mounting strap 45 is additionally secured to the top of the scuttle-dash.

Figure 6B:
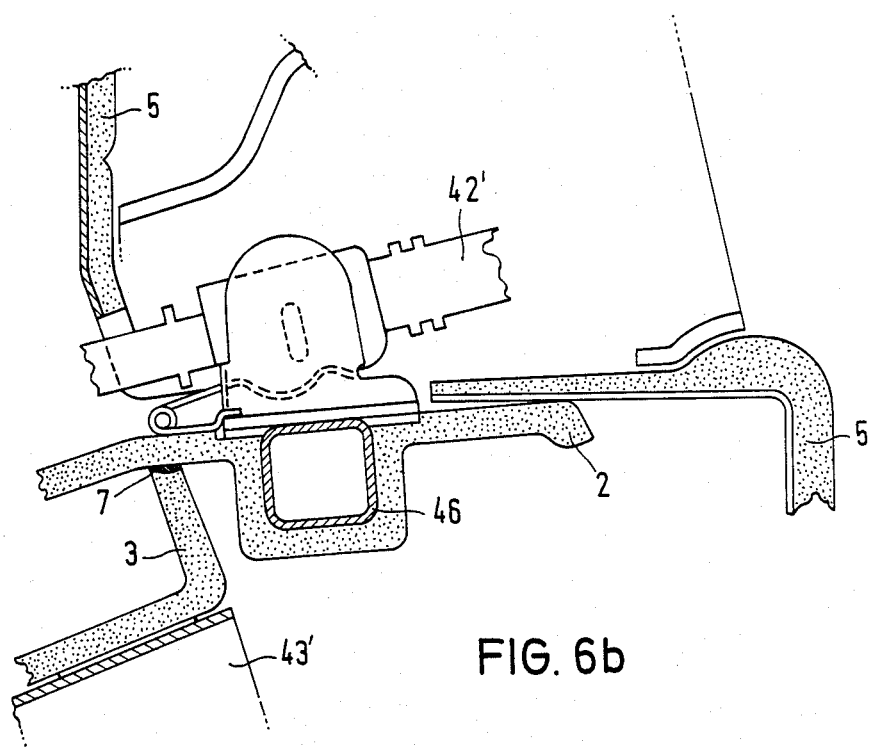
FIG. 6b is a partial section through the other embodiment.

In another embodiment (FIG. 6b) the steering column arrangement 42' is mounted on a transverse support 46 which is integrated in the component 2, while the pedal arrangement 43' is disposed in a separate pedal block which is secured to the part 2 and to the dashboard.

A heating partition wall 47, against which a heat exchanger 33—which can be inserted and removed through lateral openings 41—bears, is disposed in corresponding receiving members 56 in the heating casing lower part 34, the heating casing lower part 34 being closed at one end by the connection plate 48 of the heat exchanger 33 and at the other end by a closure cover 57.

As is customary per se there is formed in the heating casing lower part 34 an air distribution casing 49 which in conjunction with a separate inserted air distribution casing 50 and an inserted air distribution flap 51 controls the air distribution between the foot space and the defroster nozzles and central nozzles. In this connection the air distribution casing 50 is provided with integrally formed or attached distribution ducts 52 to the defroster nozzles.

The lower support part 3 is closed in the region of the glove compartment 35 by a glove compartment flap 53 with the appropriate hinge and locking devices, an ashtray (not shown) can be inserted in the region of the ashtray receiving member 36 and an appropriate car radio device 58 (cf. FIG. 1) can be inserted in the radio receiving member 38.

In addition, the lower support part 3 can comprise receiving members 31 for a plurality of electrical switches, as are usually disposed on the lower edge of an instrument panel. The appropriate electrical cabling between the components mounted on the lower support part part 3 can again be provided in the form of face plate lines or printed circuits.

Figure 7:
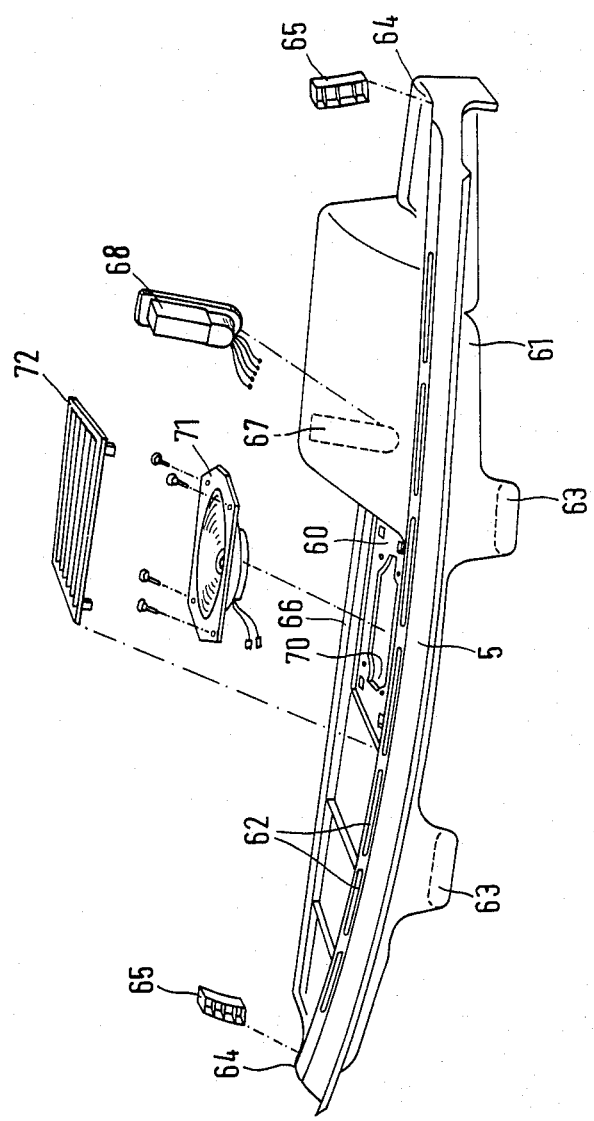
FIG. 7 is an exploded view of the instrument panel covering with the components insertable therein.

As can best be seen from FIG. 7 in conjunction with FIG. 1 at the top of the right-hand side, the instrument panel covering 5 forms together with an internal support part 60 of fibre-reinforced rigid polyurethane foam material, an air distribution duct 61 which leads to defroster nozzles 62 and which is supplied by way of connection sockets 63 by the air ducts 52 of the air distribution casing 50 inserted in the lower part component 3. Receiving members 64 for lateral nozzles 65, which are likewise supplied by way of the integrally formed air guide duct 61, are provided in the lateral region of the instrument panel covering 5. In addition, receiving members 66 are provided in the instrument panel covering 5 for central nozzles 28 which are directly supplied by way of the air ducts 27 and 28 from the mixing space of the heating unit. Furthermore, the instrument panel covering 5 comprises a receiving member 67 for an operating unit 68 for the ventilating, heating and air-conditioning unit.

In addition, the support part 60 of the instrument panel covering 5 comprises a receiving member 70 for a speaker 71, which is covered in conventional manner by a covering grid plate 72.

In this connection the support part 60 of the instrument panel covering 5 has moulded around it a support and filling foam which, in conjunction with a dyed skin-forming polyurethane mixture formed directly in the expansion mould, forms the outer profile of the instrument panel covering 5 acting as a padding. The strength of the support part 60 of a rigid polyurethane foam material fibre-reinforced from a mat of endless fibres can in this connection be deliberately controlled by appropriate shaping such that the instrument panel covering can fully meet any applicable safety requirements in the event of a head impact on the part of a passenger.

Since the structural member formed by the two assembled components and the plurality of units arranged therein is inserted fully completed into the bodywork structure and is firmly secured to the latter in a supporting manner, the replacement of units which is necessary on occasion and which experience shows to be caused by wear or other functional problems, must be provided for.

These units are primarily the cold and heat exchanging units 22 and 23 and the blower 21. It is explained in conjunction with FIG. 1 how such defective units can be replaced.

Replacing the blower 21 is relatively simple by removing the blower cover 4. It is equally easy to replace the cold exchanger 22 by removing the return-air air-conditioning covering 4'.

The replaceability of the heat exchanger 33 is made possible in a special manner.

The connection sockets 78 of the heat exchanger 33 project beyond the lower heating casing 34 only sufficiently far in the direction of the dashboard 75 for them still to remain completely inside the passenger compartment. In the dashboard 75 is provided an opening 76 into which a cup-shaped component 77 is inserted in such a way that it receives the connection sockets 78 of the heat exchanger 33 in a sealed manner by way of appropriate devices. In this way the passenger compartment is completely closed off in a sealed manner from the engine space. In this connection the heat exchanger 33 is connected to the coolant circuit of the internal combustion engine by way of the tube connections 78 which are disposed on the appropriate coolant tubes and engage with the connection sockets 74 in a fluid-tight manner so as to prevent inadvertent loosening.

If it is necessary to replace a heat exchanger 33, the tube connections 78 are pulled off, and then the cup-shaped component 77 is removed, so that the heat exchanger 33 together with the connection sockets 74 projecting on its connection plate 48 can be removed laterally from the opening 41.

The main components of the scuttle-dash instrument panel component according to the invention mentioned in connection with FIGS. 3, 4, 5, 6 and 7 may of course have added to them the aforesaid components of the ventilating, heating and air-conditioning unit as well as the steering and pedal arrangement in widely differing degrees of automation, i.e. the corresponding actuating devices for the control mixing and distributing flaps can be made possible in a simple mechanical rod system arrangement, while in the case of a more expensive layout it can be effected in the form of controlled stepping motors directly connected to the corresponding flaps.

In the same way it is clear that the completed scuttle-dash instrument panel component can be tested in its functioning outside the motor vehicle so that only those structural members found to be in order can be assembled in the motor vehicle bodywork.

In addition, it is to be understood that appropriate sealing devices in the form of foam washers or foam strips, as shown in part in the drawing without being indicated by reference numerals, can be arranged on the components to be joined to one another or on the groups of components to be inserted. The same applies to fastening components which may possible by necessary, such as screws, clamps and the like.

We claim:

1. A motor vehicle instrument panel of plastics material having an integrated ventilating and heating unit, comprising:
    a first part extending between inner walls of a bodywork of a motor vehicle, having integrally formed hollows and walls adapted to receive components of the ventilating and heating unit;
    a second part extending between said inner walls and having hollows and walls corresponding in shape and location to the hollows and walls of the first part;
    components of the ventilating and heating unit received by said hollows and walls of said first part and said second part; and
    a covering component which engages at least one of said first part and said second part and covers a component of the ventilating and heating unit therein;
    both the first part and the second part having a peripheral surface in a substantially horizontal junction plane and being securely adhesively joined to one another at such peripheral surface and thereby together forming a substantially box-shaped transverse support member fixedly attached to said inner walls of the bodywork structure by means of lateral flanges approximately in said junction plane, each of which lateral flanges is received in an approximately horizontal guide channel in a corresponding one of said inner walls, certain space within said guide channels not being filled by said flanges and being filled with adhesive to form a positive connection between said flanges and said inner walls, the transverse support member cooperating with the bodywork structure as a structural member.

2. The motor vehicle instrument panel according to claim 1, further comprising a pre-assembled pedal block and steering column arrangement and a pre-assembled pedal arrangement, said pre-assembled pedal block and steering column arrangement and said pedal arrangement being secured to said instrument panel by means of a first mounting strap on said first part, and a second mounting strap on an upper side of said first part, and to a scuttle-dash of said motor vehicle by said second mounting strap and to a dashboard of said motor vehicle by means of a pedal block mounting flange integral with said bodywork structure.

3. The motor vehicle instrument panel according to claim 2, wherein said steering column arrangement is detachably pre-assembled and joined to a transverse support which is integral with said first part, and said pedal block is pre-assembled to said second part.

4. The motor vehicle instrument panel according to claim 1, wherein an upper side of said first part comprises an integrally formed blower casing portion, integrally formed return-air air-conditioning casing portion, and one or more integrally formed webs adapted to provide an area for adhesion to a scuttle-dash of the motor vehicle, and wherein a portion of a heating casing is integrally formed on a lower side of said first part, and wherein an upper side of said second part comprises an integrally formed heating casing portion with air guide ducts and an integrally formed air distributor casing portion, and wherein said instrument panel component further comprises an integrally formed glove compartment.

5. The motor vehicle instrument panel according to claim 4, further comprising a blower cover and a return-air air-conditioning cover consisting of non-reinforced rigid polyurethane foam material.

6. The motor vehicle instrument panel according to claim 5, further comprising an instrument panel cover comprising a support member consisting of fibre-reinforced rigid polyurethane foam material and air guide duct portions integrally formed in said support member.

7. The motor vehicle instrument panel according to claim 1, further comprising a heating partition wall and an air distributor casing attached to and positioned between said first part and said second part, consisting of non-reinforced rigid polyurethane foam material.

8. The motor vehicle instrument panel according to claim 1, further comprising air guide ducts positioned within said first part and air distribution ducts positioned within said second part, said air guide ducts consisting of non-reinforced rigid polyurethane foam material.

9. The motor vehicle instrument panel according to claim 1, further comprising air flow control flaps disposed proximate ventilating, heating and air-conditioning ducts, consisting of non-reinforced rigid polyurethane foam material.

10. The motor vehicle instrument panel according to claim 1, further comprising a glove compartment flap consisting of fibre-reinforced rigid polyurethane form material.

11. The motor vehicle instrument panel according to claim 4, characterized in that said second part in the region of said heating casing portion provides lateral openings through which a heat exchanger can be installed and withdrawn.

12. The motor vehicle instrument panel according to claim 1, characterized in that said guide channels have a U-shaped cross-section and said lateral flanges have an irregular H-shaped cross-section.

13. A method of manufacturing a motor vehicle, wherein:
(A) a motor vehicle scuttle-dash instrument panel is assembled, said instrument panel having an integrated ventilating and heating unit and comprising:
a first part extending between inner walls of a motor vehicle bodywork structure, having integrally formed hollows and walls adapted to receive components of the ventilating and heating unit;
a second part extending between said inner walls and having hollows and walls corresponding in shape and location to the hollows and walls of the first part;
components of the ventilating and heating unit being received by said hollows and walls of said first part and said second part;
a covering component which engages at least one of said first part and said second part and covers a component of the ventilating and heating unit therein;
both the first part and the second part having a peripheral surface in a substantially horizontal junction plane and being securely adhesively joined to one another at such peripheral surface and thereby together forming a substantially box-shaped transverse support member having lateral flanges approximately in said junction plane;
a steering column arrangement; and
a pedal arrangement supporting the steering column arrangement;
(B) said instrument panel then is inserted into a motor vehicle bodywork structure and is fixedly attached to said inner walls of said bodywork structure by means of said lateral flanges, each of which lateral flanges is received in an approximately horizontal guide channel in a corresponding one of said inner walls, certain space within said guide channels not being filled by said flanges and being filled with adhesive to form a positive connection between said flanges and said inner walls, the transverse support member cooperating with the bodywork structure as a structural member;
(C) said pedal arrangement having a top and bottom, is secured at the top to a scuttle-dash of said motor vehicle; and
(D) said pedal arrangement is secured at the bottom to a dashboard of the motor vehicle by means of a pedal block mounting flange integral with said bodywork structure.

14. The method of claim 13, wherein said steering column arrangement is detachably pre-assembled and joined to a transverse support which is integral with said first part, and said pedal block is pre-assembled to said second part.

15. The method of claim 13, wherein an upper side of said first part comprises an integrally formed blower casing portion, integrally formed return-air air-conditioning casing portion, and one or more integrally formed webs adapted to provide an area for adhesion to a scuttle-dash of the motor vehicle, and wherein a portion of a heating casing is integrally formed on a lower side of said first part, and wherein an upper side of said second part comprises an integrally formed heating casing portion with air guide ducts and an integrally formed air distributor casing portion, and wherein said instrument panel component further comprises an integrally formed glove compartment.

16. The method of claim 13, wherein said scuttle-dash instrument panel component further comprises a blower cover and a return-air air-conditioning cover consisting of non-reinforced rigid polyurethane foam material.

17. The method of claim 13, wherein said scuttle-dash instrument panel component further comprises an instrument panel cover comprising a support member consisting of fibre-reinforced rigid polyurethane foam material and air guide duct portions integrally formed in said support member.

18. The method of claim 13, wherein said scuttle-dash instrument panel component further comprises a heating partition wall and an air distributor casing attached to and positioned between said first part and said second part, consisting of non-reinforced rigid polyurethane foam material.

19. The method of claim 13, wherein said scuttle-dash instrument panel component further comprises air guide ducts positioned within said first part and air distribution ducts positioned within said second part, consisting of non-reinforced rigid polyurethane foam material.

20. The method of claim 13, wherein said scuttle-dash instrument panel component further comprises air flow control flaps disposed in the region of ventilating, heating and air-conditioning ducts, consisting of non-reinforced rigid polyurethane foam material.

21. The method of claim 13, wherein said scuttle-dash instrument panel component further comprises a glove compartment flap consisting of fibre-reinforced rigid polyurethane foam material.

22. The method of claim 15, wherein said scuttle-dash instrument panel component is characterized in that said second part in the region of said heating casing portion provides lateral openings through which a heat exchanger can be installed and withdrawn.

23. The method of claim 13, wherein said scuttle-dash instrument panel component is characterized in that said guide channels have a U-shaped cross-section and said lateral flanges have an irregular H-shaped cross-section.

* * * * *